R. O. Lowrey.
Composite Roof.
Nº 61,746.           Patented Feb. 5, 1867.

Witnesses:
Edw Schafer
Henry Sylvester

Inventor;
Robt. O. Lowrey,
by
Mason, Fenwick & Lawrence

United States Patent Office.

ROBERT O. LOWREY, OF TABOR, IOWA.

Letters Patent No. 61,746, dated February 5, 1867.

IMPROVEMENT IN TILES AND BRICKS.

*The Schedule referred to in these Letters Patent and making part of the same.*

TO ALL WHOM IT MAY CONCERN:

Be it known that I, ROBERT O. LOWREY, of Tabor, in the county of Freemont, and State of Iowa, have invented a new and improved Water-Proof Roofing; and I do hereby declare that the following is a full, clear, and exact description thereof, reference being had to the accompanying drawings, making a part of this specification, in which—

Similar letters of reference indicate corresponding parts in the three figures.

The nature of my invention consists in making water-proof covering for roofing, or slabs, or tiles, of unburnt or unglazed clay, which are secured firmly down to the roofing boards in a suitable manner and then covered with a cement which is composed of marl and coal tar mixed together in such proportions that it will readily penetrate the surfaces of the slabs and form when dry a solid stony surface, which will not be injuriously affected by heat, nor by exposure to the weather, as will be hereinafter described. I am aware that previous to my invention cements have been made, for roofing and other purposes, in which clay and sand, clay and lime, and other earthy substances have been mixed with coal tar. Such instances may be found in the patent granted to I. G. Marsh, June 7, 1863; Abraham Straub, November 17, 1863; Zadock Street, March 11, 1862; and also in the patent of C. G. Reinbold, March 21, 1866. I am also aware that a cement has been made, for roofing purposes, of pulverized slate-stone, mixed with coal tar; and I do not lay claim to any of the cements herein referred to. I have discovered that the substance known as marl, which is found in abundance in many of the western States, and in other places, is peculiarly adapted for making a cement for roofing purposes when mixed with coal tar. This marl is found in a state ready for mixture without previous preparation, and it is found to answer a much better purpose for roofing than common clay, or other substances above referred to as having been used before.

To enable others skilled in the art to understand my invention, I will describe its construction and operation.

Figure 1:
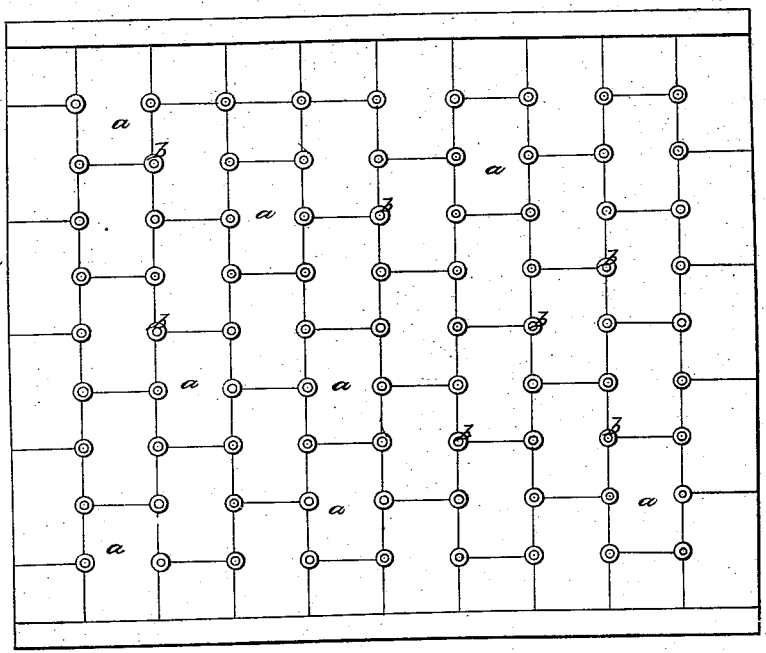
Figure 1 is top view of a roof with the unglazed tiles secured upon it previous to covering them with cement.
Figure 2:
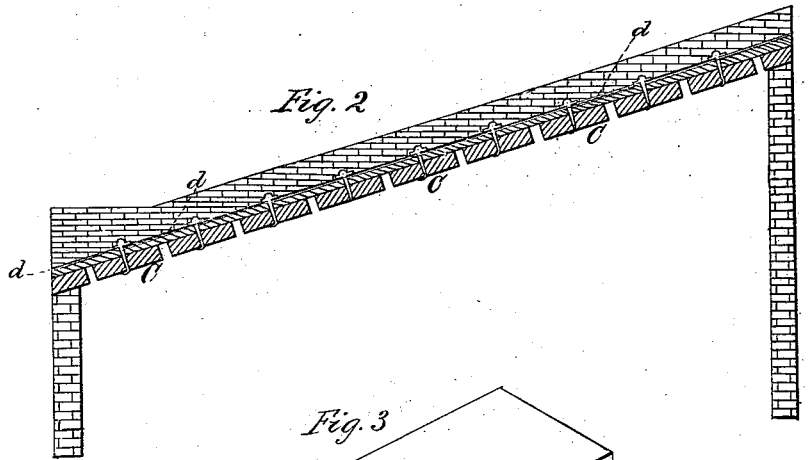
Figure 2 is a sectional view of the roof when finished.
Figure 3:
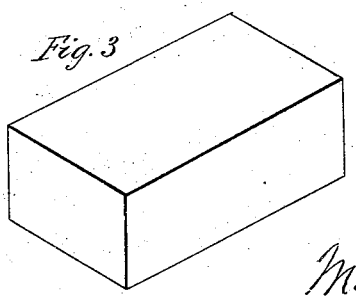
Figure 3 is a sectional view of a portion of an unglazed tile, showing the effect of the cement upon it.

The cement consists of marl and coal tar mixed together, when cold or hot, in suitable proportions to form a plastic cement, which can be spread upon surfaces with a trowel. The use of raw tar is preferred, as it has been found that boiled tar liquefies under the influence of the sun, whereas the raw tar, when mixed with marl, becomes harder the longer it is exposed to the action of the sun. Thick or thin cement may be made by varying the proportions of the above substances. This cement forms the covering for a roof which is constructed as follows:

In the accompanying drawings, *a a* represent thin slabs or tiles of any suitable size, which are arranged upon the roofing boards and cemented together at their edges. These tiles are secured down in place by means of nails, having thin washers applied to their heads, which nails are driven between the joints of the tiles into the roofing boards and clinched so as to hold the tiles firmly in place. The tiles *a* are made by mixing clay and sand with water and moulding the same after the manner of making bricks, after which they are dried but not burned. The object of using unburnt and unglazed tiles is twofold. The cement which I have above described will be absorbed by unburned tiles, and it will also unite with the dried clay very readily and form in conjunction therewith a hard, stony substance, whereas if glazed or burned tiles were used there would be no commingling of the marl and coal tar with the clay, and the cement would lie upon the surfaces of the tiles without striking into their substance and hardening them. The cement which I have above described is now spread evenly upon the tiles with a trowel, or, if desirable, it may be made so thin by an addition of coal tar as to be easily applied to the surfaces of the tiles with a brush. A portion of the coal tar and marl cement will be quickly absorbed by the tiles, and in the course of a few weeks, or even in less time, a hard crust will be formed, resembling stone, which will be impervious to the action of water. There is not only a stony crust formed on top of the slabs *a*, but the cement will strike into them and render their upper surfaces very hard and stony, thus firmly adhering to them and forming a solid surface. If from any cause the upper crust should be broken or cracked off in some places, there will still be left a hard, stony surface, which is impervious to water. In the drawings, *b* represents the nails which are used for securing the tiles upon the roofing boards. *c c* are the roofing boards, and $d$ represents the covering of cement applied to the surfaces of the tiles $a$. It will be seen by reference to fig. 2 that the covering upon the roofing boards forms a solid surface, consisting, firstly, of clay and sand; secondly, of clay, sand, marl, and coal tar; and, thirdly, of marl and coal tar. This covering will, after some length of time, turn to a stone, or a substance resembling stone in hardness and durability, which will not be injured by heat or cold, and which will be perfectly water-proof. By employing a foundation of dry porous tiles of unglazed clay and sand the cement will be quickly absorbed, and consequently my roofing is applicable to very steep roofs, as well as to those having only a slight inclination, as the cement will not run and leave places uncovered and unprotected. Another advantage of my improved roofing is, that the swelling and shrinking of the roofing boards will not be liable to crack it and cause it to leak. It is easily and cheaply applied and is perfectly fire-proof.

Having thus described my invention, what I claim as new, and desire to secure by Letters Patent, is—

1. A plastic cement, which is composed of marl and coal tar mixed together in suitable proportions, substantially as described.

2. A roof which is composed of unglazed and unburned slabs or tiles, which are secured firmly down upon the roofing boards and then covered with a cement consisting of marl and coal tar, substantially as described.

3. A roof-covering, which consists of a bottom layer of dry clay, a second layer of clay, marl, and coal tar, and a top or surface layer of marl and coal tar, applied to roofing boards, substantially as described.

R. O. LOWREY.

Witnesses:
    EDW. SCHAFER,
    HENRY SYLVESTER.